United States Patent [19]

Yasuda et al.

[11] Patent Number: 4,878,129

[45] Date of Patent: Oct. 31, 1989

[54] METHOD FOR REPRODUCTION OF STORED VIDEO SIGNALS WITH DISK REPRODUCING APPARATUS

[75] Inventors: Shigeru Yasuda; Kenichiro Yasukawa; Tsutomu Nakamura; Kenitiro Asami, all of Saitama, Japan

[73] Assignee: Pioneer Electronic Corporation, Tokyo, Japan

[21] Appl. No.: 89,795

[22] Filed: Aug. 27, 1987

[30] Foreign Application Priority Data

| Aug. 27, 1986 | [JP] | Japan | 61-202316 |
| Aug. 29, 1986 | [JP] | Japan | 61-203241 |
| Aug. 29, 1986 | [JP] | Japan | 61-203242 |
| Aug. 29, 1986 | [JP] | Japan | 61-203244 |

[51] Int. Cl.$^4$ .......................................... H04N 5/76
[52] U.S. Cl. .................................. 358/342; 360/10.1
[58] Field of Search .................. 358/312, 335, 342; 360/10.1; 369/32, 59

[56] References Cited

U.S. PATENT DOCUMENTS 4,430,675  2/1984  Fujime ........................... 360/10.1 X
4,439,791  3/1984  Hirata ............................... 358/342
4,477,843  10/1984  Kinjo et al. ......................... 358/342
4,635,134  1/1987  Sasamura et al. ................... 358/312
4,697,256  9/1987  Shinkai ............................. 369/32

Primary Examiner—James B. Mullins
Attorney, Agent, or Firm—Sughrue, Mion, Zinn, Macpeak & Seas

[57] ABSTRACT

A method for operating an optical disk player, having a memory for storing at least one frame of a video signal, under control of a programmable system controller. The disk player may be operated to set the apparatus in a pause mode at the very beginning of the desired program area on the disk. The disk player also may be operated to produce still pictures from information stored in the memory, rather than directly from the disk. The disk player can be controlled to return to a last scene that was viewed by utilizing signals uniquely identifying the particular disk and particular address on the disk where the last scene was recorded. The disk player can be operated to retrieve a last scene in response to the duration of disk reproduction time that was passed.

13 Claims, 8 Drawing Sheets

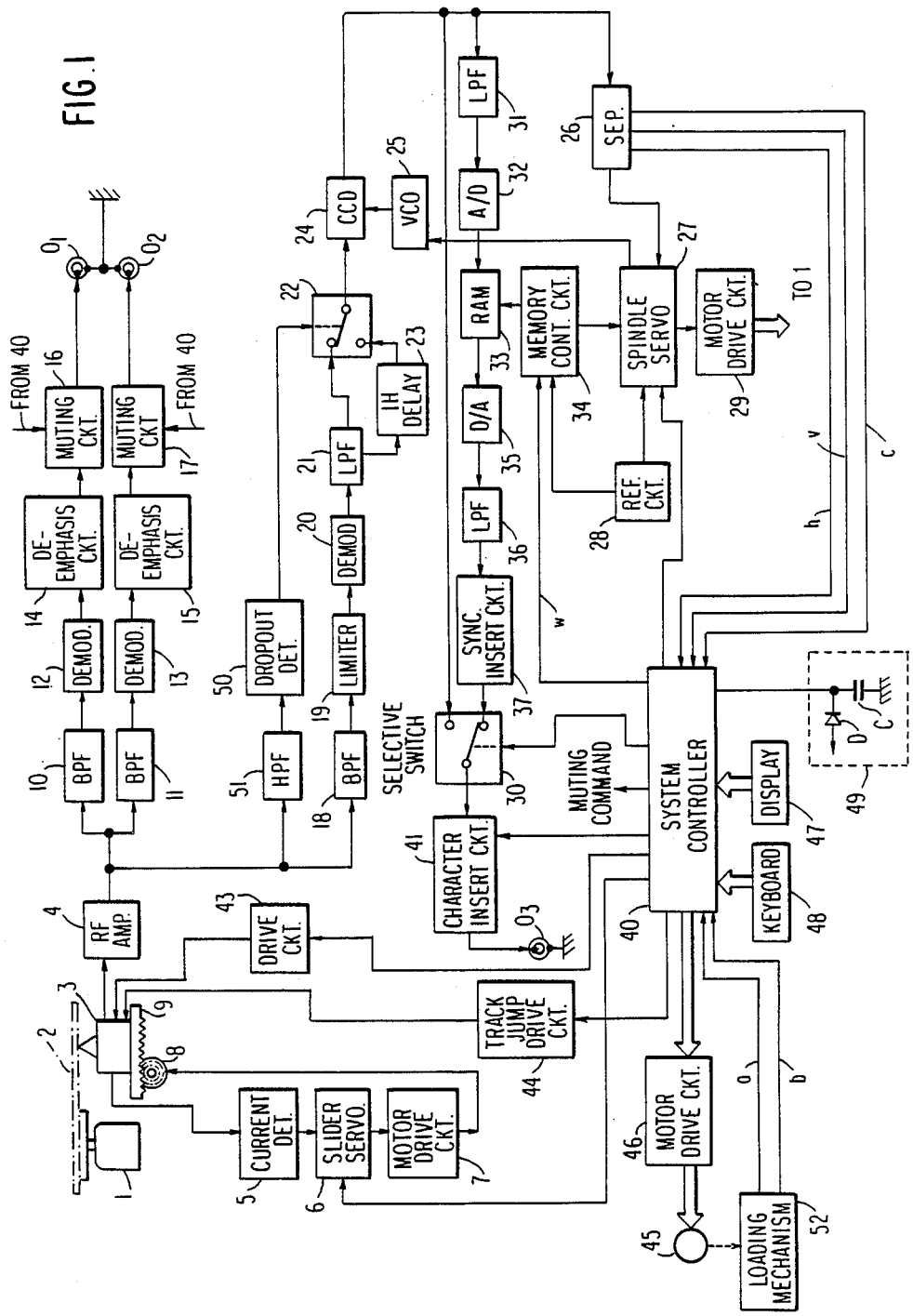

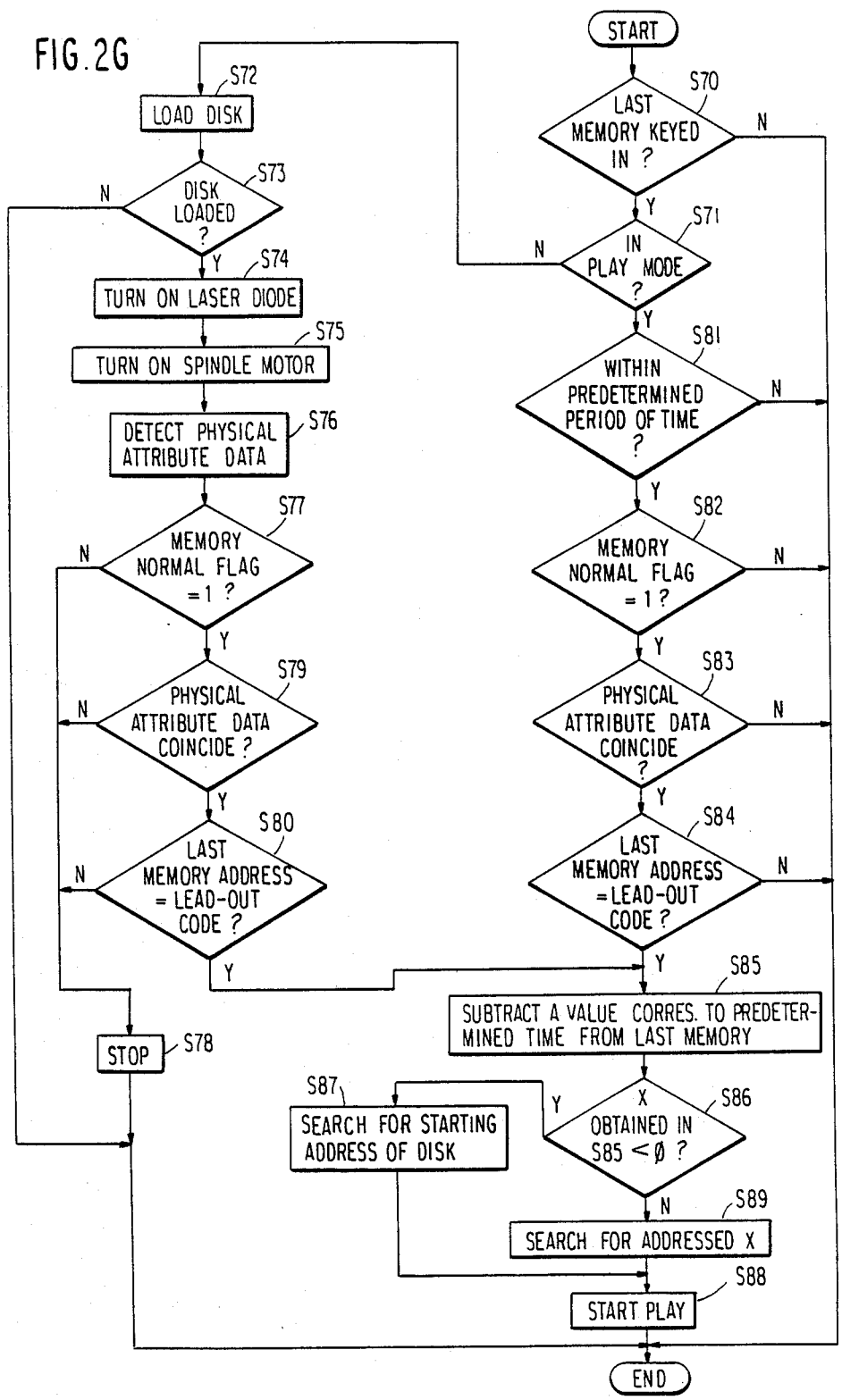

METHOD FOR REPRODUCTION OF STORED VIDEO SIGNALS WITH DISK REPRODUCING APPARATUS

BACKGROUND OF THE INVENTION

The present invention relates to a method for performing reproduction on a video reproducing apparatus of signals stored on a disk reproducing apparatus.

Disk reproducing apparatus such as video disk players are usually installed in the vicinity of a video reproducing apparatus, such as a television receiver or a color monitor. The response of current disk reproducing apparatus to user manual control is so rapid that when the user sets the disk reproducing apparatus in a reproduction mode by a keying operation, the reproduction of video information will start before he has moved to a position suitable for viewing the video reproducing apparatus. Accordingly, the user will find it impossible to watch the recorded video information, such as a motion picture, from the very beginning of the disk. This problem could be solved if the reproduction mode where initiated by remote control with the recording disk being set in a pause mode at the starting end of the program area of the disk. However in the prior art, the disk may be set in a pause mode only in response to a pause command issued during the reproduction mode. Clearly, if the disk must be in reproduction mode, information is already being reproduced when the pause command is issued This makes it difficult to attain a pause mode at the starting end of the program area of the disk and inhibits the users ability to view the recorded information (such as a motion picture) from the very beginning of the disk.

There are two kinds of recording disks in common use, namely, a CAV (constant angular velocity) disk and a CLV (constant linear velocity) disk. In a CAV disk, all of the concentric tracks formed have video information of a constant amount, say, one frame, recorded along its circumference, and the interframe portions carrying information associated with a vertical sync signal lie on a straight line extending in tee radial direction. Therefore, with a CAV disk, no irregularity will be introduced in the period of sync signals for the video signal reproduced immediately after a jumping operation is performed i.e. a shift from one track to another. This permits a special mod of reproduction, such as one for producing a still picture, to be effected in a satisfactory manner.

In a CLV disk, the amount of information recorded on the circumference of a specific track varies with its radial position and the innermost track contains a small amount of video information, say, one frame, whereas the outermost track contains a greater amount of video information say, three frames. Because of this variation, an irregularity is introduced in the period of sync signals for the video signal reproduced immediately after a jumping operation. In order to eliminate this problem, an improved type of information reproducing apparatus has been proposed. This apparatus is equipped with a video memory having a capacity for storing video signals corresponding to one frame or field. The video signals being reproduced are successively converted into digital signals in response to clock signals synchronous with those video signals and the resulting digital signals are written at preselected locations in the video memory and read out therefrom in response to external stable clock signals.

In order to ensure that, after the reproduction of a still picture is terminated, subsequent pictures will be immediately reproduced, this improved type of apparatus may be so designed that disk rotation and a jumping function can be performed during the reproduction of a still picture. However, this is not a recommended practice since the motors, actuators and some other components will inevitably wear as a result of prolonged reproduction of still pictures.

Commercial video disks have a maximum playing time of 1 hour per side. On occasion, the user may wish to interrupt the viewing of a motion picture or some other video information on the video disk while it is still in a play mode. If the user wants to see the subsequent portion of the video information after this interruption, he may search for the last scene he was viewing by performing a FF (i.e., scanning) operation on the disk reproducing apparatus. The FF operation involves alternately performing playing and track jumping actions. However, this searching procedure involves a cumbersome series of operations.

The purpose of the present invention to overcome these operational difficulties encountered in the prior art of disk reproducing apparatus.

A first object, therefore, of the present invention is to provide a method that is capable of setting a disk reproducing apparatus in a pause mode at the starting end of the program area of a disk being played.

A second object of the present invention is to provide a method by which a still picture can be reproduced from a disk reproducing apparatus, having a video memory, without causing excessive wear of motors, actuators and any other components.

A further object of the present invention is to provide a method that requires only a simple set of operations for reproducing at the beginning of a current reproduction mode the last scene that was being viewed on a disk reproducing apparatus during a previous reproduction mode that was interrupted.

SUMMARY OF THE INVENTION

The purposes of the present invention are accomplished by operating the disk reproducing apparatus, having a mechanism for automatically loading a recording disk in the reading position in accordance with a method of automatically setting the apparatus in a pause mode at the very beginning of the desired program area on the disk. When the recording disk is loaded in the reading position, a search is performed for a predetermined position at which information is recorded on said recording disk. The searching step is performed only when the reproduction of information from the recording disk is suspended. When the search is completed, the apparatus is maintained in a pause mode, ready to read the disk at the predetermined recording position that was identified in the searching step.

The purposes are further accomplished by operating the disk reproducing apparatus in accordance with a method of reproducing a still picture from information that was supplied from the recording disk and is stored in a video memory. In the method, recorded information is read from the disk in response to a still picture reproducing command and video signals of at least one field are written into the video memory. The information stored in the video memory is cyclically read and outputting as still picture information. In response to a command for stopping information reproducing, the memory information reading step is continued but the disk information reading step is stopped.

The purposes of the present invention are additionally accomplished by operating the disk reproducing apparatus in accordance with a method for reproducing the last scene viewed and identifying the physical attributes of the recording disk on which the information is recorded as well as address information identifying the position on the disk on which the scene is recorded. In a first step, in response to a memory command issued during a reproduction mode, the physical attribute information of the disk in which the video information being reproduced is recorded and the address information corresponding to the position at which the video information being reproduced is recorded are stored in a memory. In a second step, in response to a last scene reproducing command, a determination is made as to whether the physical attribute information and the address information are stored in said memory. In a third step, if it is found in the second step that the physical attribute information and the address information are stored in the memory, the stored physical attribute information is compared with information representing the physical attributes of the loaded recording disk. In a fourth step, if it is found in the third step that the two pieces of physical attribute information coincide with each other, a reproduction mode is started from the position corresponding to the address information written in said memory.

The purposes of the present invention are also accomplished by operating the disk reproducing apparatus in accordance with a method for reproducing the last scene viewed on a disk reproducing apparatus that reproduces not only address information indicating a position at which information is recorded on a recording disk, but also video information recorded n a recording disk. The method comprises a first step in which, in response to a command issued during a reproduction mode, the length of time that has elapsed following actuation of the reproduction mode is detected and a determination is made as to whether the detected time is within a predetermined value In a second step, the address information indicating a position at which the video information being reproduced is recorded is stored in a memory if it is found in the first step that the detected time exceeds the predetermined value In a third step, a determination is made as to whether the address information is stored in the memory if it is found in the first step that the detected time is within the predetermined time. In a fourth step, if it is found in the third step that the address information is stored in the memory, a reproduction mode is started from the position corresponding to the address information stored in the memory.

BRIEF DESCRIPTION OF THE DRAWINGS

FIG. 1 is a block diagram showing an information reproducing apparatus incorporating the concept of the present invention;

FIG. 2D is a flowchart illustrating the operation of the system of FIG. 1 that is conducted immediately after the power has been switched on;

FIG. 2G is a flowchart illustrating still another example of the operation of the system shown in FIG. 1; FIG. 2I is another flowchart illustrating the operation of the system of FIG. 1 that is conducted after the LAST MEMORY key has been depressed.

PREFERRED EMBODIMENTS OF THE INVENTION

Figure 2A:
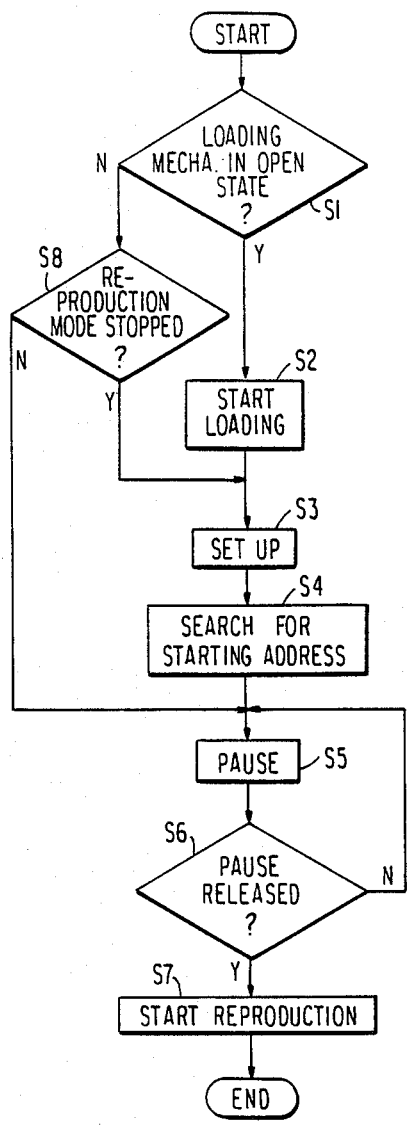
FIG. 2A is a flowchart illustrating an example of the operation of the system shown in FIG. 1.

The preferred embodiments of the present invention are hereinafter described with reference to the accompanying drawings.

FIG. 1 is a block diagram showing an information recording apparatus incorporating the concept of the present invention. As shown, the information recorded in a disk 2 that is driven to rotate by means of a spindle motor 1 is read out of the disk with an optical pickup 3 The pickup contains in its interior a laser diode, an objective lens, a focus actuator, a tracking actuator a photodetector, etc. as is conventional in the art. The output of the pickup 3 is supplied not only to an RF amplifier 4, but also to a focus servo circuit (not shown) and a tracking servo circuit (not shown). These focus and tracking servo circuits drive the focus and tracking actuators, respectively, in the pickup 3. Laser light emitted from the laser diode in the pickup 3 is focused on the recording surface to form a beam spot for information detection. The position of this beam spot is controlled in the radial direction of the disk 2 in a conventional manner such that the spot will be correctly located on a desired track on the recording surface of the disk 2.

A current is supplied to the coil for driving the tracking actuator in the pickup 3 and this coil current is further fed to a current detection circuit 5 This circuit 5 produces a current detection signal in an amount that depends upon the supplied coil current and the signal is then fed to a slider servo circuit 6 that performs amplification and phase compensation of the current detection signal. The output of the slider servo circuit 6 is sent to a motor drive circuit 7 which produces a drive signal for a slider motor 8. A slider 9 that carries the pickup 3 and which is movable in the radial direction of the disk is driven by the slider motor 8. The tracking actuator in the pickup 3 is so controlled that it will be located at the middle point of the movable range of the slider 9

The RF signal produced from the RF amplifier 4 is supplied to BPFs (band-pass filters) 10 and 11 to extract separate audio FM signals for the right and left channels. The audio FM signals for the two channels are respectively supplied to FM demodulators 12 and 13 to reproduce audio signals for the two channels. The two-channel audio signals are supplied to de-emphasis circuits 14 and 15 in which the components that have been emphasized during recording are restored to their initial levels. The audio signals produced from the de-emphasis circuits 14 and 15 are supplied to audio output terminals O₁ and O₂ through muting circuits 16 and 17, respectively. The muting circuits 16 and 17 are so configured that they will attenuate the audio signals in response to a muting command.

The RF signal produced from the RF amplifier 4 is also supplied to a BPF 18 so as to extract a separate video FM signal. This video FM signal is sent to a limiter 19 for amplitude limitation and is further sent to an FM demodulator 20 for reproducing a video signal. This video signal is supplied through a LPF (low-pass filter) 21 to one of the two input terminals of a selective switch 22 for dropout compensation. The other input terminal of the selective switch 22 is supplied with a video signal that has been delayed with a 1 H(horizontal synchronous period) delay line 23. The selective switch 22 is also supplied with a control signal in the form of a dropout detection signal produced from a dropout detector circuit 50. The dropout detector circuit 50 is supplied with the higher-frequency component of the RF signal that has been extracted by a HPF (high-pass filter) 51. The dropout detector circuit 50 may be so configured that it generates a dropout detection signal by detecting a dropout based on the zero-crossing point of the higher-frequency component of the RF signal. In response to this dropout detection signal, selective signal production from the switch 22 is controlled in such a way that when the occurrence of a dropout has been detected, a video signal that existed one horizontal sync period (1 H) beforehand, but is currently within the 1 H delay line 23, is selectively delivered from the switch 22 so as to compensate for the dropout.

The video signal delivered from the switch 22 is supplied to a CCD (charge-coupled device) 24, which is supplied with a clock from a VCC (voltage-controlled oscillator) 25. In the CCD 24, the video signal is delayed by the time corresponding to the clock frequency. The video signal produced from the CCD 24 is supplied to a separator circuit 26. The separator circuit 26 is so configured as to separate the video signal from a horizontal sync signal h, a vertical sync signal y and control data c such a a Phillips code. The horizontal sync signal h produced from the separator circuit 26 is supplied t a spindle servo circuit 27. In the spindle servo circuit 27, the horizontal sync signal h is phase-compared with the reference signal of a predetermined frequency from a reference signal generator circuit 28, thereby generating a spindle error signal in accordance with the phase difference between the two signals. This spindle error signal is fed to a motor drive circuit 29 which controls the rotating speed of the spindle motor 1. At the same time, a control signal that is determined by the phase difference between the horizontal sync signal h and the reference signal is generated and supplied to the control input terminal of the VCO 25, which then comes to oscillate at a frequency that is determined by the phase difference between horizontal sync signal h and the reference signal from 28. The output of VCO 25 will cause the signal delay time of the CCD to vary in accordance with that phase difference so as to eliminate any time base error.

The video signal from which the time base error has been eliminated by CCD 24 is supplied both to one of the two input terminals of a selective switch 30 and to a LPF 31 from which it is sent to an A/D (analog/digital) converter 32. In the A/D converter 32, video signals are periodically sampled at a predetermined interval and the sampled values are successively converted into digital data. The output data of the A/D converter 32 is supplied to a RAM 33 serving as a video memory. The addressing and mode selection of the RAM 33 are controlled by a memory control circuit 34. The memory control circuit 34 is so configured that the data written in the RAM 33 at selected addresses are successively read out in response to the clock from the reference signal generator circuit 28 and that the contents of those addresses in the RAM 33 are updated in response to a WRITE ENABLE signal w. The data read out of the RAM 33 is supplied to a D/A converter 35 for conversion into an analog signal. The output of the D/A converter 35 is supplied through a LPF 36 to a sync insert circuit 37 in which it is mixed with a sync signal to reproduce a video signal. The video signal produced from the sync insert circuit 37 is fed to the other input terminal of the selective switch 30, which is also supplied with a selection control signal from a system controller 40. The video signal that has passed through the RAM 33 or the one that has been directly supplied to the switch 30 are selectively fed from the switch 30 into a character insert circuit 41. The character insert circuit 41 is so configured that it performs such operations as synthesizing the video signal from the switch 30 with the one that corresponds to the characters displayed by the data produced from the system controller 40, and generating a video signal associated with a blue scene. The video signal produced from this character insert circuit 41 is fed to a video output terminal O₃.

The system controller 40 is a microcomputer composed of a processor, ROM, RAM and any other associated devices. The system controller 40 is supplied with various inputs such as the sync signal and control data from the separator circuit 26, data produced in response to keying-in on an operating panel 48, and a loading detection signal a and a disk detection signal b coming from a disk loading mechanism 52. In the system controller 40, the processor processes input signals in accordance with the program stored in the ROM and controls various parts of the system such as the slider servo circuit 6, muting circuits 16 and 17, spindle servo circuit 27, selective switch 30, memory control circuit 34, character insert circuit 41, a drive circuit 43 for driving the laser diode, a track jump drive circuit 44 that drives the tracking actuator in response to a jump command, a motor drive circuit 46 for driving a motor 45 on the disk loading mechanism 52, and a display circuit 47. The power supply terminal of the system controller 40 is fed with a voltage Vcc via a diode D. A capacitor C is connected between the supply terminal of the system controller 40 and the ground. The diode D and capacitor C combine to form a backup circuit 49 so that the system controller 40 will be supplied with electric power even if the main supply is off.

The information recording apparatus having the composition described above can be set in a pause mode by the method of the present invention in the manner which is hereunder described with reference to the flowchart shown in FIG. 2A.

If a pause command is issued during the execution of a main routine or a subroutine that controls a play mode, the processor goes to step S₁ and a determination is made by the loading detection signal a as to whether the disk loading mechanism 2 is in an open state, that is, whether the disk carrying table has popped out of the housing. If it is found in step S1 that the disk loading mechanism 52 is in an open state, the processor goes to step S2 and a loading command is sent to the motor drive circuit 46 and the disk table is driven until it is accommodated in the housing. The processor then goes to step S3 and sends an actuation command to the focus servo circuit (not shown), tracking servo (not shown), slider servo circuit 6 and spindle servo circuit 27 in preparation for the reading of recorded information from the disk 2. Subsequently, the processor goes to step S4 and a search is made for the starting address of the program area on the disk 2, the pickup 3 being moved proximate to that address location. The processor then goes to step S5 and controls selected parts of the apparatus in such a way as to set it in a pause mode. Setting of a pause mode is accomplished by such operations as sending a muting command to the muting circuits 16 and 17, sending a blue scene command to the character insert circuit 41, and sending a jump command to the track jump drive circuit 14.

If it is found in step S1 that the disk loading mechanism 52 is not in an open state, the processor goes to step S8 and determines whether the apparatus is in a reproduction stop mode. If the result is positive the processor goes to step S3. If not, the processor goes to step S5.

After executing step S5, the processor goes to step S6 and determines whether a pause release command has been issued by the depressing of such keys as pause and play keys. If the result is positive, the processor goes to step S7 and starts to read recorded information from the disk 2, thereby resuming the execution of the routine that was in process immediately before going to step S1.

By the procedures described above, the apparatus is set in a pause mode at the starting address in the program area of the disk 2 and information reproduction is started from the starting address in the program area in response to a pause release command.

As will be understood from the foregoing description, according to the present invention, an information reproducing apparatus is set in a pause mode at the starting end of the program area and the pause mode is thereafter released by the user who performs remote control after he has moved to a position where he can watch the video reproducing apparatus. This enables the user to watch a motion picture or some other video information from the starting end of the disk. An additional advantage of the present invention is that the information recorded on the disk can be easily dubbed (copied onto another recording medium) from the exact starting end of the program area of the disk.

The sequence of operating the same apparatus in a still picture reproducing mode is hereunder described with reference to the flowchart shown in FIG. 2B.

If a still picture reproducing command is issued by the depressing of an appropriate key such as a scene lock key when the apparatus is in a play mode or is reading recorded information from the disk 2 by means of execution of a main routine or a subroutine that controls the play mode, the processor goes to step S11 and sends a WRITE ENABLE signal w in response to the vertical sync signal from the separator circuit 26, thereby writing into RAM 33 the video signals of one field obtained from the disk 2. The processor then goes to step S12 and controls the reading and output of the contents of the video memory. Subsequently the processor goes to step S13 and determines whether a stop command for stopping the play mode or takeup command for unloading the disk 2 has been issued. If it is found in step S13 that either a stop command or takeup command has been issued, the processor goes to step S14 and performs a selection control of the switch 30. In the selected position, the video signal from RAM 33 is selectively delivered from the switch 30 to the video output terminal 42. The processor then goes to step S15 and determines whether the CLEAR key has been depressed. If the result is negative, the processor returns to step S14 and the stored video signal is continuously supplied to the output terminal 42. If the result is positive, the processor goes to step S16. This resumes the execution of the routine that was in process immediately before going to step S11 and a WRITE ENABLE signal w is sent throughout the period required to update the information stored at all addresses in RAM 33.

In the sequence of operations described above, even if reproduction of information from the disk 2 is discontinued by the stopping of the play mode in response to a stop command or takeup command, a picture can still be reproduced since the video signals of one field written in RAM 33 are sent to the video output terminal 42. If, in this instance, the CLEAR key is depressed, the information stored at all addresses in RAM 33 is updated and no video information is supplied from the disk 2. As a result, the information stored in RAM 33 is erased to squelch the reproduced picture.

Figure 2B:
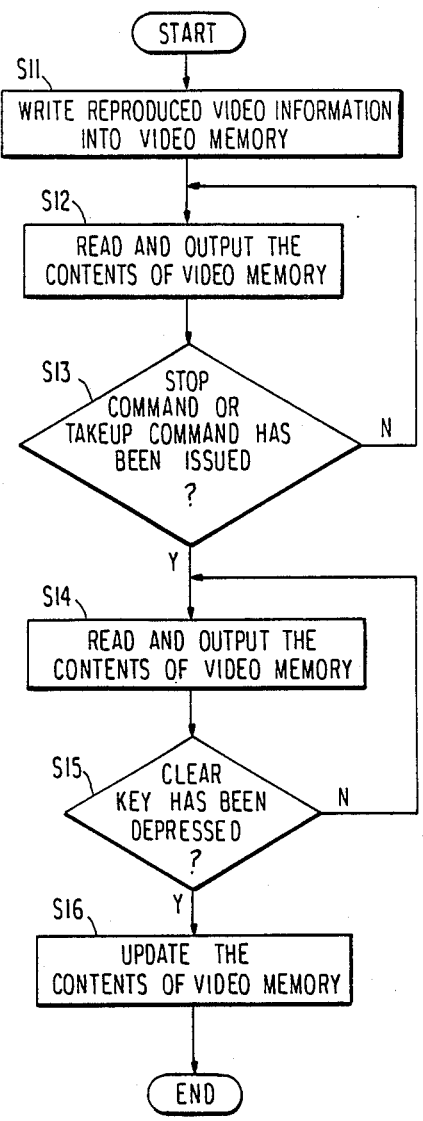
FIG. 2B is a flowchart illustrating another example of the operation of the system shown in FIG. 1.
Figure 2C:
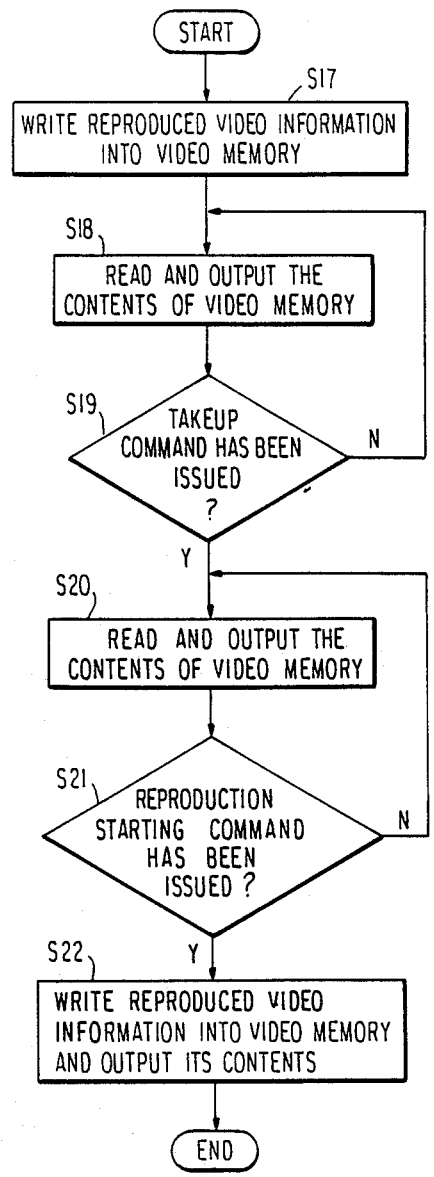
FIG. 2C is a flowchart illustrating a further example of the operation of the system shown in FIG. 1.

FIG. 2C is a flowchart illustrating another example of the operation of the system shown in FIG. 1. The operations performed in steps S17 and S18 in FIG. 2C are the same as those performed in steps S11 and S12 in FIG. 2B. After executing step S18, the processor goes to step S19 and determines whether a takeup command has been issued. If the result is negative, the processor returns to step S18. If the result is negative, the processor returns to step S18. If the result of determination in step S19 is positive, the processor goes to step S20 and performs a selection control of the switch 30. In the selected position, the video signal from RAM 33 is selectively delivered from the switch 30 to the video output terminal 42. The processor then goes to step S21 and determines whether the disk 2 has been loaded and a reproduction start command issued. If it is found in step S21 that no reproduction start command has been issued, the processor returns to step S20. Otherwise, the processor goes to step S22 and sends a WRITE ENABLE signal w in response to the vertical sync signal v delivered from the separator circuit 26, so that the video signals of one field obtained from the disk 2 are written into RAM 33. This resumes the execution of the routine that was in process before going to step S17.

In the sequence of operations described above, even if reproduction of information from the disk 2 is discontinued by the topping of the play mode in response to takeup command, a picture can still be reproduced since the video signals of one field written in the RAM 33 are delivered to the video output terminal 42. If, in response to the takeup command, the disk loading mechanism is operated so as to unload the disk 2 and if a reproduction start command is issued after another disk has been loaded, the video signal obtained from that disk is written into RAM 33 and subsequently is read out to be delivered to the video output terminal 42, thereby enabling information reproduction by the video signal obtained from said another disk.

The foregoing description of the embodiments shown in FIGS. 2B and 2C assumes that video signals of one field are written into RAM 33. In an alternative embodiment, the storage capacity of RAM 33 may be sufficiently increased so that a desired number of scenes selected from among those recorded in one or more disks can be written into RAM 33. Even if a disk is unloaded from the apparatus, one of the scenes written in the RAM 33 from that disk can be selectively read out and reproduced from the apparatus.

In accordance with the above-described method of still picture reproduction of the present invention, a stop command that is issued after a scene lock command will permit the apparatus to stop reading recorded information from the disk and to perform reproduction of a still picture from stored video information, thereby avoiding excessive wear of the motors, actuators or any other components of the apparatus. Since the operation of the motors, actuators and all other mechanically moving parts of the apparatus is stopped during the still picture reproduction mode, the power consumption also is reduced and there is no potential for damage of the disk or any other problems that occur on account or erroneous operation of the mechanized elements of the apparatus. As a further advantage, still pictures can be reproduced from memory, even if there is no disk loaded in the apparatus, thereby allowing information to be viewed, while disks are stored under favorable environmental condition.

The sequence of reproducing the last scene from a disk reproducing apparatus in accordance with the present invention is hereinafter described with reference to FIGS. 2D through 2H.

When the power is switched on, the processor goes to step S31 and performs a memory check by comparing a predetermined bit pattern with the bit pattern of data that is obtained by reading the contents of predetermined addresses in the RAM in the system controller 40. The processor then goes to step S32 and determines, based on the results of the comparison conducted in step S31, whether there is any abnormality in the information stored in the RAM in the system controller 40. If, as a result of testing in step S32, it is found that the information stored in the RAM in system controller 40 is abnormal, the processor goes to step S33 in which it clears the MEMORY NORMAL flag and starts to execute a routine for performing necessary operations such as the initializing of selected parts. If the result of he execution of step S32 shows the absence of any abnormality in the contents of storage in the RAM in system controller 40 the processor goes to step S34 and sets the MEMORY NORMAL flag to start the execution of another routine.

If keying-in is performed on the operating panel 48 while a main routine or a subroutine for controlling the play mode is being executed, the processor goes to step S35 and determines whether a last scene reproducing command has been issued by the depressing of the LAST MEMORY key. If the result is negative, the processor resumes the execution of the routine that was in process immediately before going to step S35. If the result of testing in step S35 is positive, the processor goes to step S36 and determines whether the apparatus is in a play mode.

If the result of checking in step S36 is negative, the processor goes to step S37 and sends a loading command to the motor drive circuit 46 so as to actuate the disk loading mechanism 52 into a disk loading mode. The processor then goes to step S38 and for the presence or absence of a disk based on a disk detection signal b. If the result of checking is negative i.e., no disk is present, the processor resumes the execution of the routine that was in process immediately before going to step S35. If the result of checking in step S38 is positive, the processor goes to step S39 and sends a lighting signal to the drive circuit 43 so that laser light will be emitted from the laser diode in the pickup 3. The processor then goes to step S40 and sends an actuation command to the spindle servo circuit 27 focus servo circuit (not shown), tracking servo circuit (not shown) and to the slider servo circuit 6 in preparation for the reading of recorded information from the disk 2. In the next place, the processor goes to step S41, in which it detects physical attributes of the disk 2 such as its size, recording format (CAV/CLV) and recording surface (side A/side B) and stores data on the detected physical attributes at an address designated "present value memory" in the RAM in the system controller 40. The processor then goes to step S42 and determines whether the MEMORY NORMAL flag has been set. If the result is negative the processor goes to step S43 and, after stopping the reading mode, resumes the execution of the routine that was in process immediately before going to step S35. If the result of checking in step S42 is positive, the processor goes to step S44 and compares the data for physical attributes of the disk that is stored in the "present value memory" with the data for physical attributes of the disk that is stored in an area designated "last memory" in the RAM in the system controller 40. Based on the result of this comparison, the processor determines whether the physical attributes of the disk presently being played coincide with those of the disk played on the last occasion. If the result of checking in step S44 is negative, the processor returns to step S43. If the result is positive, the processor goes to step S45 and determines whether the address written in the last memory coincides with the code for the lead-out area of the disk 2. If the result of checking in step S45 is negative, the processor returns to step S43. If the result if positive (i.e., the address written in the last memory coincides with the code for the lead-out area), the processor goes to step S50 and searches for the address written in the last memory. Subsequently, the processor starts to perform in the play mode from the searched address and resumes the execution of the routine that was in process immediately before going to step S35.

If, as a result of checking in step S36, it is found that the apparatus is in a play mode, the processor goes to step S46 and determines whether a predetermined time has elapsed from the start of the play mode. If the result is positive, the processor resumes the execution of the routine that was in process immediately before going to step S35. If the result is positive, the processor resumes the execution of the routine that was in process immediately before going to step S35. If the result of checking in step S46 is negative, the processor goes to step S47 and determines whether the MEMORY NORMAL flag has been set. If the result of this checking is negative, the processor resumes the execution of the routine that was in process immediately before going to step S35. If the result of checking in step S47 is positive, the processor goes to step S48 and compares the data for physical attributes of the disk that is stored in the "present value memory" with the data for physical attributes of the disk that is stored in the "last memory". Based on the result of this comparison, the processor determines whether the physical attributes of the disk presently being played coincide with those of the disk played on the last occasion. If the result of testing in step S48 is negative, the processor will resume the execution of the routine that was in process immediately before going to step S35. If the result of testing in step S48 is positive, the processor goes to step S49 and determines whether the address written in the last memory coincides with the code for the lead-out area. If the result of checking in step S49 is negative, the processor resumes the execution of the routine that was in process immediately before going to step S35. If the result is positive, the processor goes to step S50.

If keying-in is manually performed by the user during a play mode while a subroutine or the like for controlling the play mode is being executed, the processor goes to step S60 (FIG. 2F) and determines whether a memory command has been issued by the depressing of the memory command key. If the result is negative, the processor resumes the execution of the routine that was in process immediately before going to step S60. If the result of checking in step S60 is positive, the processor goes to step S61 and the data for physical attributes of the disk presently being played is transferred to an address designated "last value memory" in the area of the last memory. The processor then goes to step S62 and the address data indicating the address at which the information being reproduced is recorded is transferred to a predetermined address in the area of the last memory. The processor then goes to step S63 and writes data having a predetermined bit pattern at a predetermined address in the RAM in the system controller 40, thereby resuming the execution of the routine that was in processes immediately before going to step S60.

If the memory command key is depressed when the user has to temporarily stop the viewing of a motion picture or some other video information, the data indicating the address at which the interrupted scene is recorded is written into the "last memory" by the sequence of steps S60 through S63. Even if the power is thereafter switched off, power continues to be supplied to the system controller 40 by means of the backup circuit 49 so the data written in the "last memory" is stored and held in an unaffected state.

If the user switches on the power in order to watch scenes that are subsequent to the interrupted scene, the processor carries out the execution of steps S31 and S34 and determines whether there is any abnormality in the information stored in the RAM in the system controller 40. If any abnormality is found in the information stored in this RAM, the MEMORY NORMAL flag is cleared to prevent subsequent use of the data stored in the "last memory".

If the user depresses the LAST MEMORY key in the next place, the processor carries out the execution of steps S35 and S51. Also, the disk is automatically loaded in the apparatus and, if it is found that the physical attributes of the loaded disk coincide with those of the disk that was made the subject of a temporary interruption of the play mode, the address representing the position at which the interrupted scene is recorded is searched for and the apparatus starts to operate in a play mode from the location of the searched address.

If the user depresses the LAST MEMORY key within a predetermined period of time after operation in a play mode has been initiated, the address representing the position at which the interrupted scene is recorded is also searched for and the apparatus is again set in a play mode at that address.

FIG. 2G is a flowchart illustrating another example of the operation of the processor in the system controller 40. The operations that are performed by steps S70 to S84 in FIG. 2G are the same as those performed by steps S35 to S49 in FIG. 2E. If, in step S80 or S84, it is found that the address written in the "last memory" coincides with the code for the lead-out area, the processor goes to step S85 and subtracts from said address data a value that corresponds to a predetermined time. The processor then goes to step S86 and determines whether data x obtained in step S85 is smaller than 0.

If it is found in step S86 that data x is smaller than 0, the processor goes to step S87 and searches for the starting address of the disk 2. The processor then goes to step S88 and allows the apparatus to start to operate in a play mode at the searched address, thereby resuming the execution of the routine that was in process immediately before going to step S70.

If it is found in Step S86 that data x is not smaller than 0, the processor goes to step S89, searches for the address corresponding to data x, and then goes to step S88.

If the user depresses the LAST MEMORY key, the sequence of operations described above permits the apparatus to be set in a play mode at an address that precedes the one at which the interrupted scene is recorded and the user can readily recollect the story (i.e., going on in that particular scene).

Figure 2D:
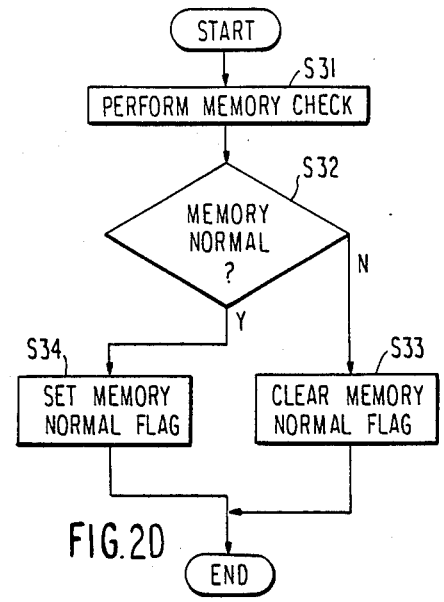
Figure 2F:
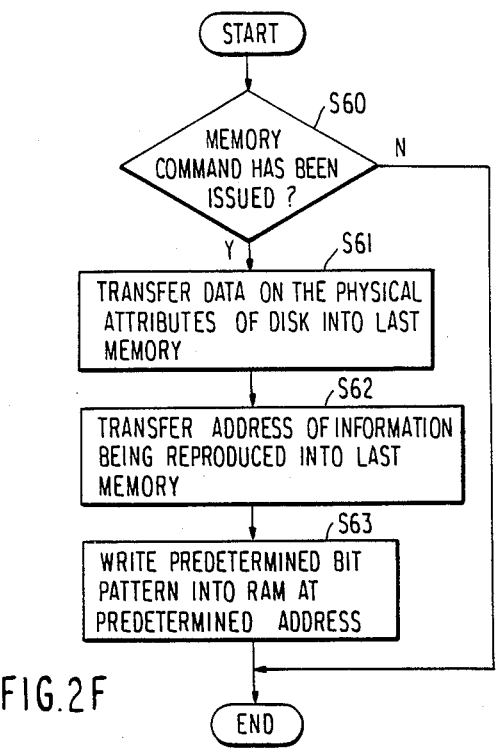
FIG. 2F is a flowchart illustrating the operation of the system of FIG. 1 that is conducted after the MEMORY COMMAND key has been depressed.
Figure 2E:
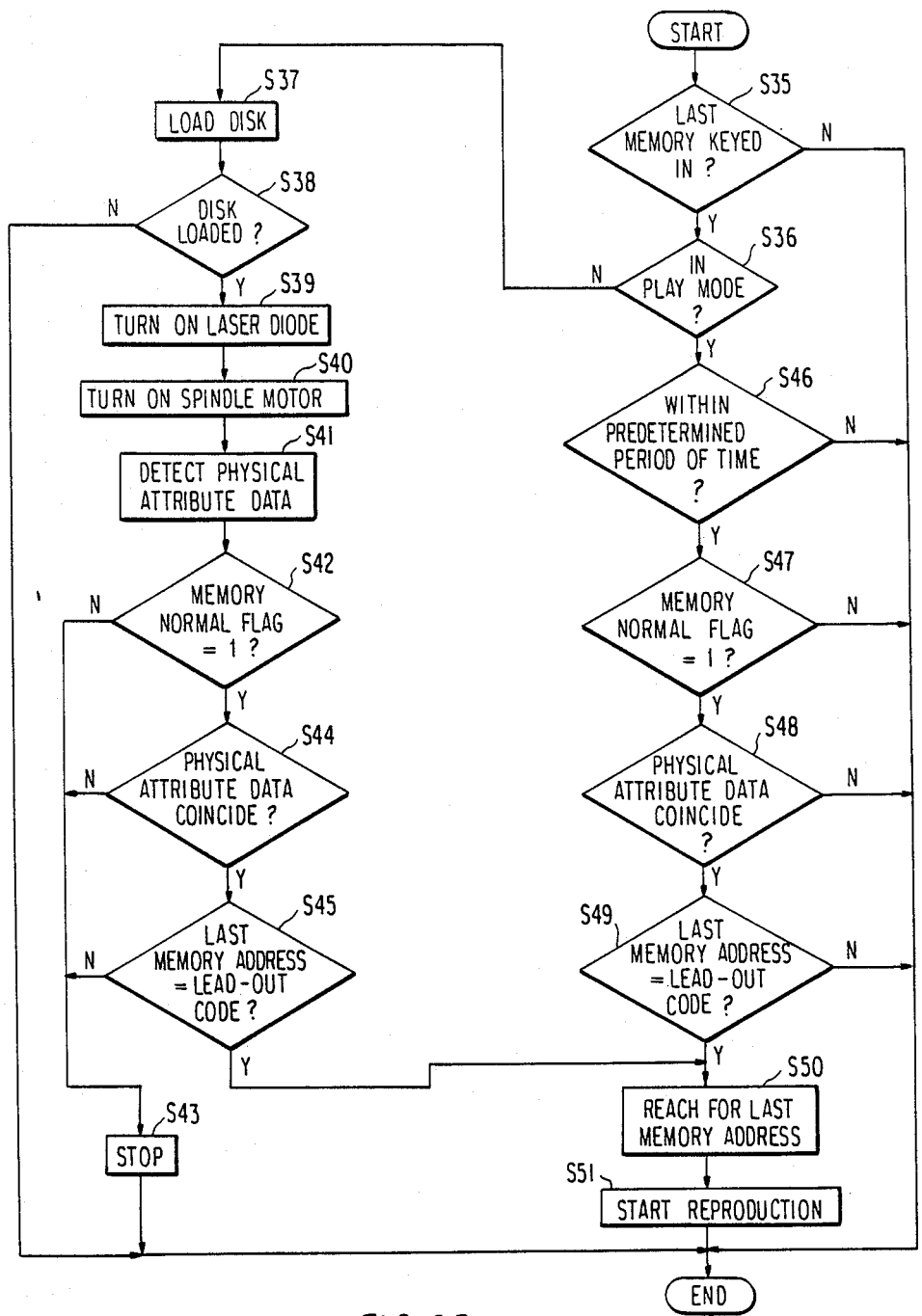
FIG. 2E is a flowchart illustrating the operation of the system of FIG. 1 that is conducted after the LAST MEMORY key has been depressed.
Figure 2H:
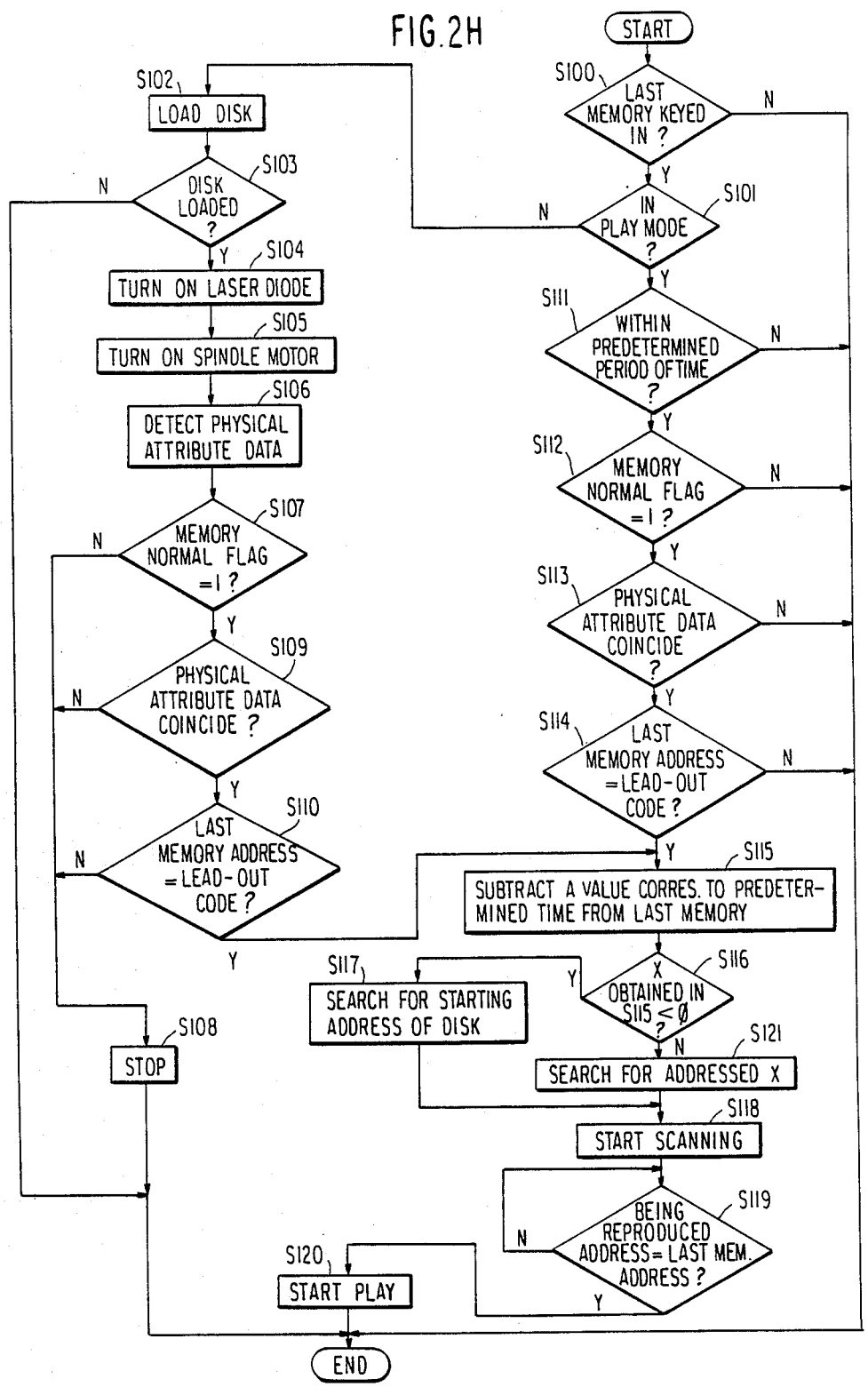
FIG. 2H is a flowchart illustrating a still further example of the operation of the system shown in FIG. 1.
Figure 21:
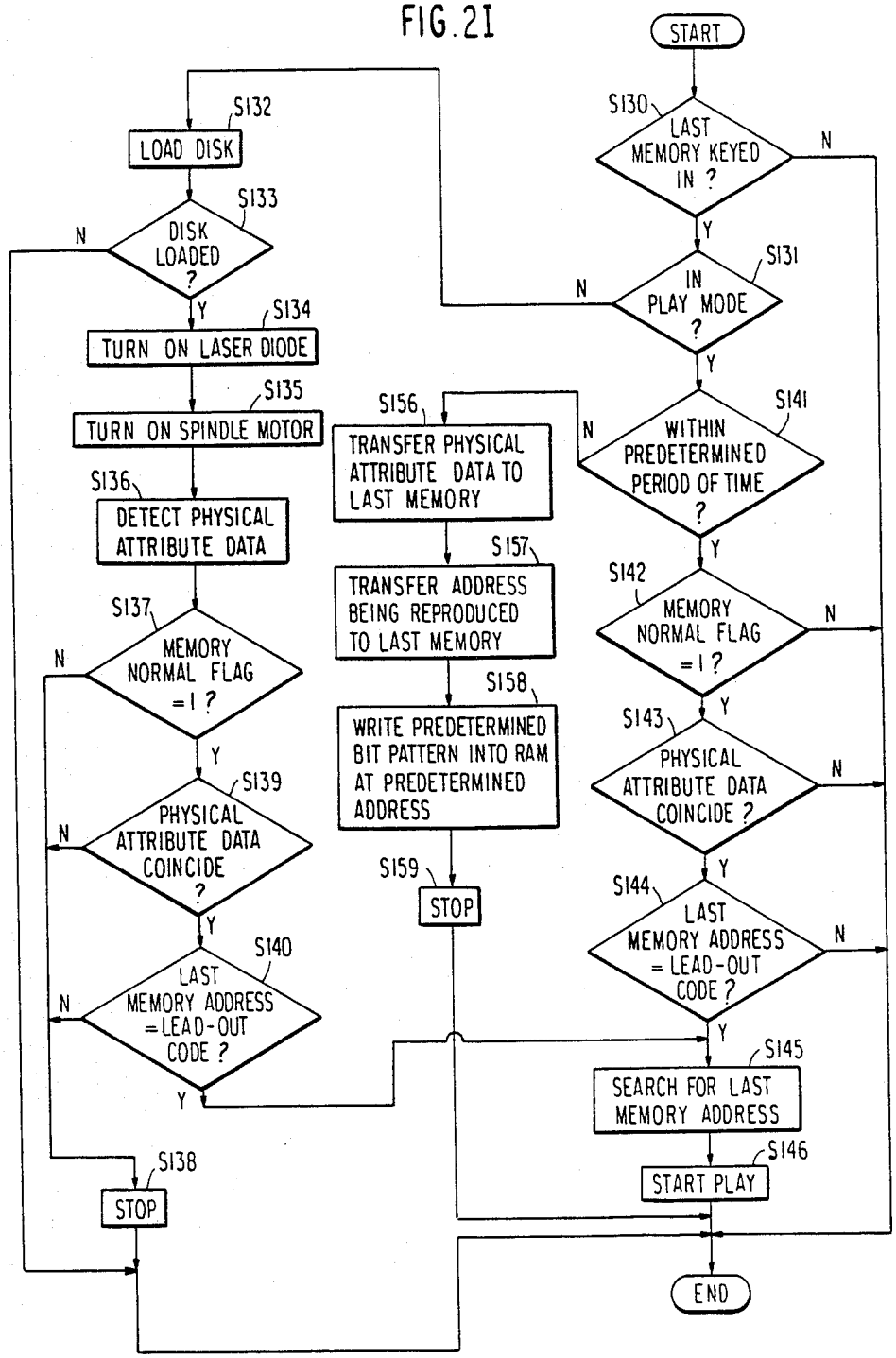

FIG. 2H is a flowchart illustrating still another example of the operation of the processor in the system controller 40. The operations that are performed by steps S100 and S114 in FIG. 2H are the same as those performed by steps S35 and S49 in FIG. 2E. If, in step S110 or S114, it is found that the address written in the "last memory" coincides with the code for the lead-out area, the processor goes to step S115 and subtracts from said address data a value that corresponds to a predetermined time. The processor then goes to step S116 and determines whether data x obtained in step S115 is smaller than 0.

If the result of checking in step S116 is positive, the processor goes to step S117 and searches for the starting address of the disk 2. The processor then starts a scanning operation from the searched address. The scanning operation is carried out by alternative playing and track jumping actions. Subsequently, the processor goes to step S119 and makes repeated comparison between the address data read from the disk 2 by the playing action and the address data written in the last memory. When the two kinds of address data coincide, the processor goes to step S120 and starts to operate in a play mode from the address indicated by the address data written in the last memory.

If it is found in step S116 that data x is not smaller than 0, the processor goes to step S121 and searches for the address corresponding to data x. Thereafter the processor goes to step S118.

If the user depresses the LAST MEMORY key, the above described sequence of operations allows the apparatus to scan the disk from an address that precedes the address at which the interrupted scene is recorded and then to start to operate in a play mode at the latter address thereby enabling the user to recollect the story readily and in short time.

As described above, in accordance with one embodiment of the method of the present invention for reproducing the last scene viewed on a disk reproducing apparatus, the address at which the information being reproduced is recorded and data representing the physical attributes of the disk being replayed are stored in a memory in response to a memory command, and the information recorded at the stored address is reproduced in response to a last scene reproducing command if the data on physical attributes of the disk loaded in the apparatus coincide with the stored data on physical attributes. Therefore, the user is capable of starting to reproduce the interrupted scene by merely depressing two keys (e.g. LAST MEMORY key and memory command key just once.

Another embodiment of the method of the present invention for reproducing the last scene viewed on a disk reproducing apparatus is hereunder described with reference to the flowcharts shown in FIGS. 2D and 2I.

If keying-in is performed on the operating panel 48 while a main routine or a bus routine for controlling the play mode is being executed after completion of the routine shown by the flow chart of FIG. 2D, the processor goes to step S130 and determines whether a command has been issued by the depressing of the LAST MEMORY key. If the result is negative, the processor resumes the execution of the routine that was in process immediately before going to step S130. If the result of checking in step 130 is positive, the processor goes to step S131 and determines whether the apparatus is in a play mode.

If the result of checking in step S131 is negative, the processor goes to step S132 and sends a loading command to the motor drive circuit 46 so as to actuate the disk loading mechanism (not shown) into a disk loading mode. The processor then goes to step S133 and checks for the presence or absence of a disk based on a disk detection signal b. If the result of checking is negative (i.e., no disk is present), the processor resumes the execution of the routine that was in process immediately before going to step S130. If the result of checking in step S133 is positive, the processor goes to step S134 and sends a lighting signal to the drive circuit 43 so that the laser light will be emitted from the laser diode in the pickup 3. The processor then goes to step S135 and sends an actuation command to the spindle servo circuit 27, focus servo circuit (not shown), tracking servo circuit (not shown) and to the slider servo circuit 6 in preparation for the reading of recorded information from the disk 2. In the next place, the processor goes to step S136 in which it detects certain physical attributes of the disk 2 such as its size, recording format (CAV/CLV) and recording surface (side A/side B) and stores data representing the detected physical attributes at an address designated "present value memory" in the RAM in the system controller 40. The processor then goes to step S137 and determines whether the MEMORY NORMAL flag has been set. If the result is negative, the processor goes to step S138 and, after stopping the reading mode, resumes the execution of the routine that was in process immediately before going to step S130. If the result of checking in step S137 is positive, the processor goes to step S139 and compares the data representing physical attributes of the disk that are stored in the "present value memory" with the data representing physical attributes of the disk that are stored in an area designated "last memory" in the RAM in the system controller 40. Based on the results of this comparison, the processor determines whether the physical attributes of the disk presently being played coincide with those of the disk played on the last occasion. If the result of checking in step S139 is negative, the processor returns to step S138. If the result is positive, the processor proceeds to step S140 and determines whether the address written in the last memory coincides with the code for the lead-out area of the disk 2. If the result of checking in step S140 is negative, the processor returns to step S138. If the result is positive (i.e., the address written in the last memory coincides with the code for the lead-out area), the processor goes to step S145 and searches for the address written in the last memory. Subsequently, the processor starts to perform a play mode from the searched address and resumes the execution of the routine that was in process immediately before going to step S130.

If, as a result of checking in step S131, it is found that the apparatus is in a play mode, the processor goes to step S141 and determines whether a predetermined time has elapsed from the start of the play mode. If the result is negative, the processor goes to step S142 and determines whether the MEMORY NORMAL flag has been set. If the result of this checking is negative, the processor resumes the execution of the routine that was in process immediately before going to step S130. If the result of checking in step S142 is positive, the processor goes to step S143 and compares the data representing the physical attributes of the disk that is stored in the "present value memory" with the data representing the physical attributes of the disk that is stored in the "last memory". Based on the result of this comparison, the processor determines whether the physical attributes of the disk presently being played coincide with those of the disk played on the last occasion. If the result of testing in step S143 is negative, the processor will resume the execution of the routine that was in process immediately before going to step S130. If the result of testing in step S143 is positive, the processor goes to step S144 and determines whether the address written in the last memory coincides with the code for the lead-out area. If the result of checking in step S144 is negative, the processor resumes the execution of the routine that was in process immediately before going to step S130. If the result is positive, the processor goes to step S145.

If it is found in step S141 that a predetermined time has elapsed from the start of the play mode, the processor goes to step S156 and data indicating the physical attributes of the disk presently being played is transferred to an address designated "last value memory" in the area of the last memory. The processor then goes to step S157 and address data indicating the address at which the information being reproduced is recorded is transferred to a preselected address in the area of the last memory. Subsequently, the processor goes to step S158 and writes data having a predetermined bit pattern at a preselected address in the RAM in the system controller 40. The processor then goes to step S159 and, after stopping the reproduction mode, resumes the execution of the routine that was in process immediately before going to step S130.

If the LAST MEMORY key is depressed by the user who has to temporarily stop watching a motion picture or some other video information after a predetermined time has elapsed from the start of the play mode, the sequence of operations in steps S156 to S159, ensures that the data indicating the address at which the interrupted scene is recorded is written in the last memory. Even if the power is thereafter turned off, power continues to be supplied to the system controller 40 by means of the backup circuit 49, so the data written in the "last memory" is stored and held in an unaffected state.

If the user switches on the power in order to watch scenes subsequent to the interrupted scene, the processor carries out the execution of steps S31 through S34 (FIG. 2D) and determines whether there is any abnormality in the contents stored in the RAM in the system controller 40. If any abnormality is found in the contents stored in this RAM, the MEMORY NORMAL flag is cleared to prevent subsequent use of the data stored in the "last memory".

If the user depresses the LAST MEMORY key in the next place, the processor carries out the execution of steps 130 and S146; the disk is automatically loaded in the apparatus and if it is found that the physical attributes of the loaded disk coincide with those of the disk that was made the subject of a temporary interruption of the play mode, the address representing the position at which the interrupted scene is recorded is searched for and the apparatus starts to operate in a play mode from the location of the searched address.

If the user depresses the LAST MEMORY key within a predetermined period of time after operation in a play mode has started, the address at which the interrupted scene is recorded is also searched for and the apparatus is again set in a play mode at that address by the sequence of steps S141 and S146. Therefore, even if a play mode is started by erroneous depressing of the play command key the user is capable of reproducing the interrupted scene by simple depressing the LAST MEMORY key within a predetermined time following the actuation of the play mode.

As described above, in accordance with another embodiment of the method of the present invention for reproducing the last scene viewed on a disk reproducing apparatus, the length of time that elapses after the actuation of a reproduction mode is detected in response to a command that has been issued during the reproduction mode, and if the detected length of time is found to exceed a predetermined value, address information indicating the position at which the video information being reproduced is recorded is stored in a memory, and if the detected length of time is found to be within the predetermined value, operation of the apparatus is started in a reproduction mode at a position that corresponds to the address information stored in the memory. Therefore, the user is capable of starting to reproduce the interrupted scene by merely depressing a single key (e.g. LAST MEMORY key).

What is claimed is:

1. A method of setting in a pause mode a disk reproducing apparatus having a pickup apparatus for reading a disk and a mechanism for automatically loading a recording disk in the reading position, said method comprising the following steps:
    detecting a pause command:
    detecting the state of said automatic loading mechanism in response to a pause command:
    if it is found that said automatic loading mechanism is not in such a state that said recording disk is loaded in the reading position, operating said automatic loading mechanism in order to load said recording disk in said reading position, and searching for a predetermined position at which information is recorded on said disc;
    if it is found in said state detecting step that said automatic loading mechanism is in such a state that said recording disk is loaded in the reading position or following the step of operating said automatic loading mechanism to place said recording disk in the reading position, said searching step being performed only when the reproduction of information from said recording disk is suspended; and
    setting the operation of the disk reproducing apparatus in a pause mode when said pickup mechanism is proximate said predetermined position on said recording disk.

2. The method of claim 1 in which if following said detecting step it is determined that said recording disk is loaded in the reading position.
    determining whether the disk reproduction apparatus is in a reproduction stop mode during which reproduction of information is suspended.

3. The method of claim 1 further comprising the step of releasing said pause mode when said reproduction apparatus enters a play mode.

4. A method of reproducing a still picture in an information reproducing apparatus from a disk reproducing apparatus that is equipped with a video memory for storing video information supplied from a recording disk that stores said video information as a plurality of fields, said method comprising the following steps:
    in response to a still picture reproducing command to said disk reproducing apparatus, issued during a play mode, reading recorded video information from said recording disk and writing video information comprising signals of at least one field into said video memory; and
    cyclically reading stored video information from said video memory and outputting the same as still picture information;
    in response to a command stopping the play mode, continuing said memory information reading step, but stopping said disk information reading step; and
    outputting said memory information to said information reproducing apparatus.

5. The method of claim 4 wherein, in response to a clear command during said outputting step, said play mode is resumed and said memory reading step is terminated 6. The method of claim 4 wherein the memory information reading step, performed after a command stopping the play mode, is continued even after a takeup command is given to unload the disk.

7. A method for reproducing the last scene viewed on a disk reproducing apparatus, having a video memory, that reproduces not only video information recorded on said disk, but also information representing the physical attributes of a recording disk and address information indicating a position at which information is recorded on the recording disk, said method comprising the following steps:
    a first step in which, in response to a memory command issued during a reproduction mode, said physical attribute information for the disk on which the video information being reproduced is recorded, and said address information corresponding to the position at which the video information being reproduced is recorded, are stored in said memory;
    a second step in which, in response to a last scene reproducing command, a determination is made as to whether said physical attribute information and said address information are stored in said memory;
    a third step in which, if it is found in the second step that said physical attribute information and said address information are stored in said memory, the stored physical attribute information is compared with information representing the physical attributes of the loaded recording disk: and
    a fourth step in which, if it is found in the third step that the two pieces of physical attribute information coincide with each other, a reproduction mode is started from the position corresponding to said address information written in said memory.

8. The method of claim 7 wherein, in response to a command issued during a reproduction mode and prior to said second step, the length of time that has elapsed following actuation of that reproduction mode is detected and a determination is made as to whether the detected time is within a predetermined value and said second step is performed only if said detected time is within said predetermined value.

9. The method of claim 8 wherein, if said detected time is not within said predetermined value, said physical attribute information and said address information are transferred to a articular memory location.

10. A method for reproducing the last scene viewed on a disk reproducing apparatus, having a video memory, that reproduces not only video information recorded on a recording disk, but also address information indicating a position at which information is recorded on said recording disk, said method comprising the following steps:

a first step in which, in response to a command issued during a reproduction mode, the length of time that has elapsed following actuation of that reproduction mode is detected and a determination is made as to whether the detected time is within a predetermined value;

a second step in which said address information indicating a position at which the video information being reproduced is recorded is stored in said memory, if it is found in the first step that the detected time exceeds the predetermined value;

a third step in which a determination is made as to whether said address information is stored in said memory, if it is found in the first step that the detected time is within the predetermined time; and a fourth step in which, if it is found in the third step that said address information is stored in said memory, a reproduction mode is started from the position corresponding to said address information stored in said memory.

11. The method of claim 10 in which, following said third step, a value is subtracted from the address information stored in said memory, said value corresponding to a predetermined length of time, and a new address is created.

12. The method of claim 11 in which the result of said subtraction step is used to determine whether or not scanning for the searched address is to be carried out by alternative playing and jumping actions.

13. The method of claim 12 in which, if the result of said subtraction step is less than a predetermined threshold, the scanning is conducted directly from the address in memory and, if the result of said subtraction step is greater than said predetermined threshold, the scanning is conducted from said new address.

* * * * *